(12) United States Patent
Tanimura et al.

(10) Patent No.: US 8,000,590 B2
(45) Date of Patent: Aug. 16, 2011

(54) DRIVING APPARATUS, IMAGE CAPTURING UNIT, AND IMAGE CAPTURING APPARATUS

(75) Inventors: Yasutaka Tanimura, Nara (JP); Akira Kosaka, Yao (JP); Natsuki Yamamoto, Amagasaki (JP); Masataka Hamada, Osakasayama (JP); Yoshihiro Hara, Takatsuki (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 512 days.

(21) Appl. No.: 12/034,079

(22) Filed: Feb. 20, 2008

(65) Prior Publication Data

US 2008/0205868 A1 Aug. 28, 2008

(30) Foreign Application Priority Data

Feb. 23, 2007 (JP) ................................. 2007-043737

(51) Int. Cl.
*G03B 17/00* (2006.01)

(52) U.S. Cl. ......................................... 396/75; 310/309

(58) Field of Classification Search .............. 396/72–75, 396/90, 439; 348/208.11
See application file for complete search history.

(56) References Cited

U.S. PATENT DOCUMENTS

| 5,801,472 | A | * | 9/1998 | Wada et al. | 310/309 |
| 2006/0130088 | A1 | * | 6/2006 | Chen | 720/681 |

OTHER PUBLICATIONS

K. Kurabayashi, "MEMS application (4) Formation of "polymer MEMS" on Si and application to biotechnology and optical technology by utilizing flexibility and transparency", Nikkei Microdevices, May 2005, No. 239, pp. 71-76; Together with a partial English-language translation thereof.

* cited by examiner

*Primary Examiner* — Clayton E Laballe
*Assistant Examiner* — Warren Fenwick
(74) *Attorney, Agent, or Firm* — Sidley Austin LLP (57) ABSTRACT

An object of the preset invention is to provide a technique capable of preventing occurrence of an assembly error. A driving apparatus for driving an object includes: a driving part having a stationary part and a moving part; and a displacement transmitting part for transmitting a displacement to the object in accordance with a drive displacement of the moving part. The displacement transmitting part and the moving part coupled to the displacement transmitting part are integrally molded.

11 Claims, 7 Drawing Sheets

DRIVING APPARATUS, IMAGE CAPTURING UNIT, AND IMAGE CAPTURING APPARATUS

This application is based on application No. 2007-043737 filed in Japan, the contents of which are hereby incorporated by reference.

BACKGROUND OF THE INVENTION

1. Field of the Invention

The present invention relates to a driving mechanism for moving an object.

2. Description of the Background Art

In recent years, a small electronic device (for example, a cellular phone) to which an image capturing function is added by mounting a micro camera unit (MCU) is being spread rapidly. With the spread, a driving apparatus used for an AF mechanism or a zoom mechanism for the MCU is being downsized.

There is a driving apparatus using MEMS (Micro Electro Mechanical Systems) manufactured by the semiconductor microfabrication technique to realize downsizing. For example, in Katsuo Kurabayashi "MEMS application (4) Formation of "polymer MEMS" on Si and application to biotechnology and optical technology by utilizing flexibility and transparency", NIKKEI MICRODEVICES, May 2005, No. 239, pp. 71-76, a driving apparatus for driving a member-to-be-driven (a lens in this case) made of PDMS (polydimethylsiloxane) in a perpendicular direction as an application example of polymer resin (polymer) MEMS is proposed.

The number of parts constructing such a driving apparatus is about 20, and the number of parts connecting those parts is also about 20. As the driving apparatus is becoming smaller, it becomes difficult to connect the parts with high precision, and there is a problem such that an assembly error occurs.

SUMMARY OF THE INVENTION

An object of the present invention is to provide a technique capable of preventing occurrence of an assembly error.

To achieve the object, according to a first aspect of the present invention, a driving apparatus for driving an object includes: a driving part having a stationary part and a moving part displaced relative to the stationary part; and a displacement transmitting part for transmitting a displacement to the object in accordance with a drive displacement of the moving part.

In the driving apparatus, the displacement transmitting part and the moving part coupled to the displacement transmitting part are integrally molded, so that occurrence of an assembly error can be prevented.

To achieve the object, according to a second aspect of the present invention, the driving apparatus for driving an object includes: a frame member disposed on the outer periphery side of the object; a coupling member for coupling the object and the frame member; a driving part having a fixed comb electrode and a moving comb electrode coupled to the frame member, arranged so as to face the fixed comb electrode, and displaced relative to the fixed comb electrode; and an elastic member interposed between a fixed point and the frame member.

In the driving apparatus, the frame member and the moving comb electrode coupled to the frame member are integrally molded, so that occurrence of an assembly error can be prevented.

To achieve the object, according to a third aspect of the invention, an image capturing unit includes: a driving apparatus including a driving part having a stationary part and a moving part displaced relative to the stationary part, and a displacement transmitting part for transmitting a displacement to an object in accordance with a drive displacement of the moving part; and an image pickup device in which an image of a subject entered from an imaging optical system is formed. The moving part and the displacement transmitting part are integrally molded, and the object is a lens as a component of the imaging optical system.

In the image capturing unit, the displacement transmitting part and the moving part coupled to the displacement transmitting part are integrally molded. Consequently, occurrence of an assembly error can be prevented.

To achieve the object, according to a fourth aspect of the invention, an image capturing apparatus includes: a driving apparatus including a driving part having a stationary part and a moving part displaced relative to the stationary part, and a displacement transmitting part for transmitting a displacement to an object in accordance with a drive displacement of the moving part; and an image pickup device in which an image of a subject entered from an imaging optical system is formed. The moving part and the displacement transmitting part are integrally molded, and the object is a lens as a component of the imaging optical system.

In the image capturing apparatus, the displacement transmitting part and the moving part coupled to the displacement transmitting part are integrally molded, so that occurrence of an assembly error can be prevented.

To achieve the object, according to a fifth aspect of the invention, an image capturing unit includes: a driving apparatus for driving an object; and an image pickup device in which an image of a subject entered from an imaging optical system is formed. The driving apparatus includes at least one unit driving mechanism including: a frame member disposed on the outer periphery side of the object; a coupling member for coupling the object and the frame member; a driving part having a fixed comb electrode and a moving comb electrode coupled to the frame member, arranged so as to face the fixed comb electrode, and displaced relative to the fixed comb electrode; and an elastic member interposed between a fixed point and the frame member. The frame member and the moving comb electrode are integrally molded, and the object is a lens as a component of the imaging optical system.

In the image capturing unit, the frame member and the moving comb electrode coupled to the frame member are integrally molded, so that occurrence of an assembly error can be prevented.

To achieve the object, according to a sixth aspect of the invention, an image capturing apparatus includes: a driving apparatus for driving an object; and an image pickup device in which an image of a subject entered from an imaging optical system is formed. The driving apparatus includes at least one unit driving mechanism including: a frame member disposed on the outer periphery side of the object; a coupling member for coupling the object and the frame member; a driving part having a fixed comb electrode and a moving comb electrode coupled to the frame member, arranged so as to face the fixed comb electrode, and displaced relative to the fixed comb electrode; and an elastic member interposed between a fixed point and the frame member. The frame member and the moving comb electrode are integrally molded, and the object is a lens as a component of the imaging optical system.

In the image capturing apparatus, the frame member and the moving comb electrode coupled to the frame member are integrally molded, so that occurrence of an assembly error can be prevented.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinbelow with reference to the drawings.

1. Embodiment 1-1. Electrostatic Actuator

Figure 1A:
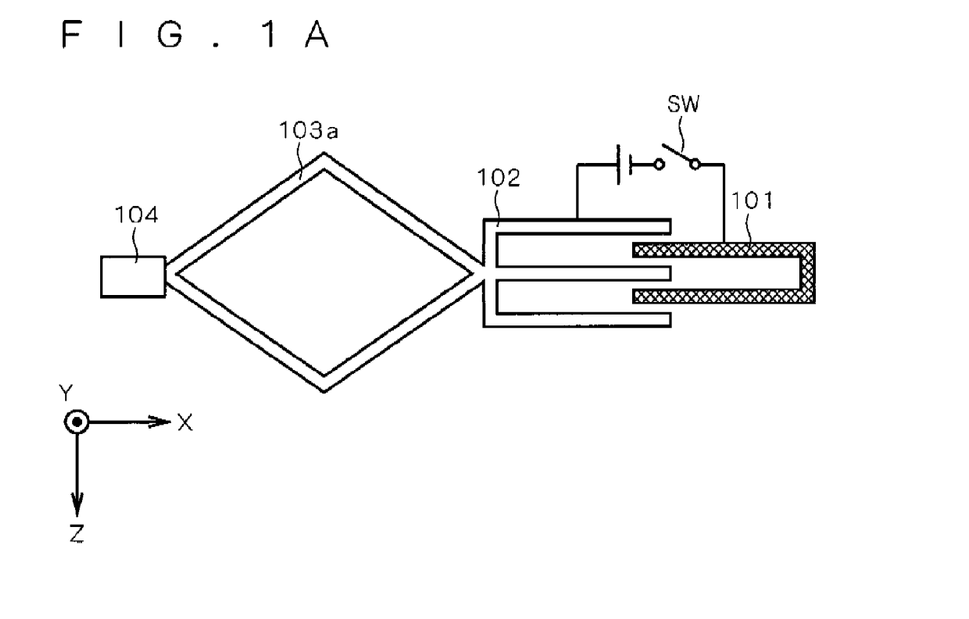
FIGS. 1A and 1B are diagrams showing the configuration and operation of an electrostatic actuator.
Figure 1B:
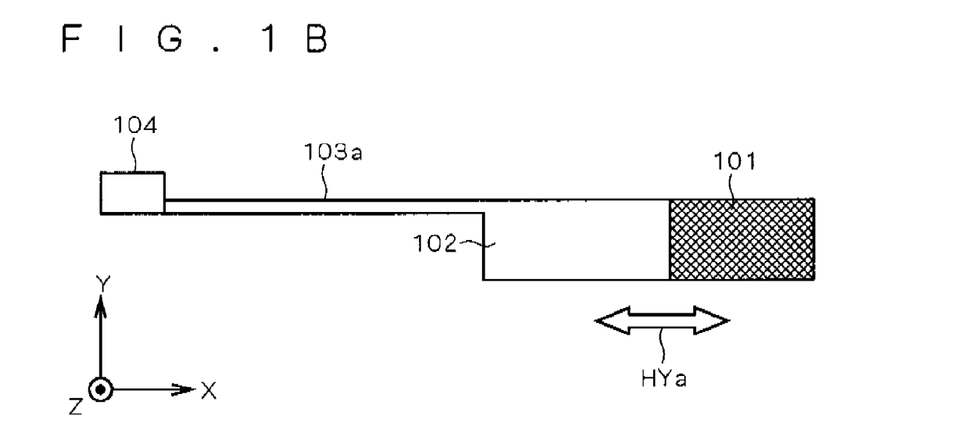

FIGS. 1A and 1B are diagrams showing a first state of the configuration and operation of an actuator (electrostatic actuator) utilizing the electrostatic action. FIG. 1A is a top view of the electrostatic actuator, and FIG. 1B is a side view of the electrostatic actuator.

Figure 2A:
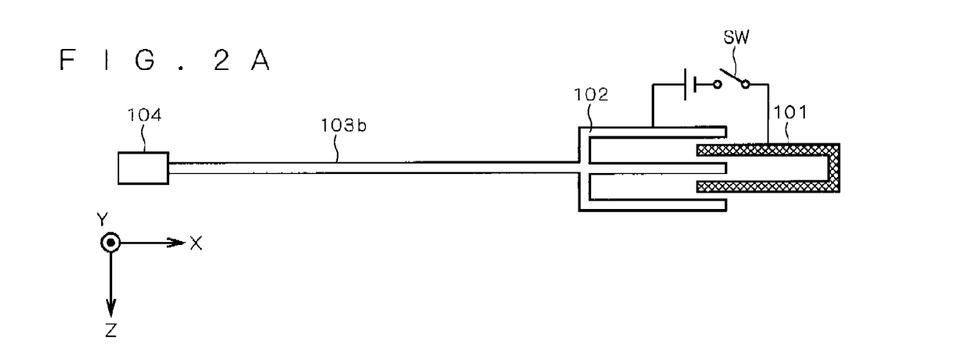
FIGS. 2A, 2B, and 2C are diagrams showing the configuration and operation of an electrostatic actuator.
Figure 2B:
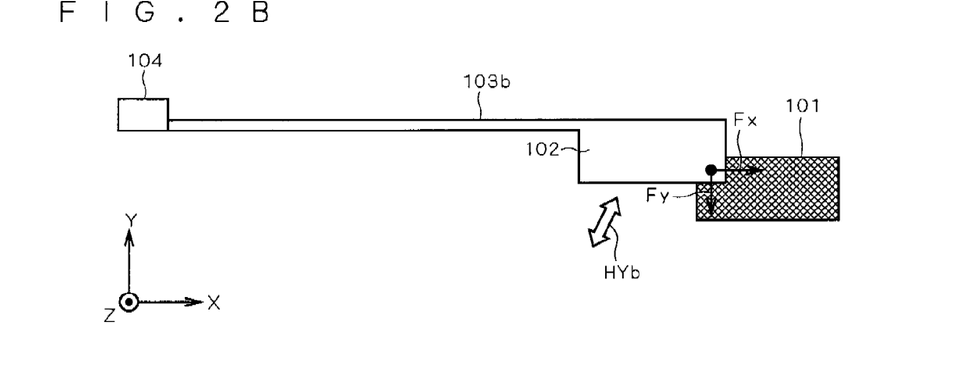
Figure 2C:
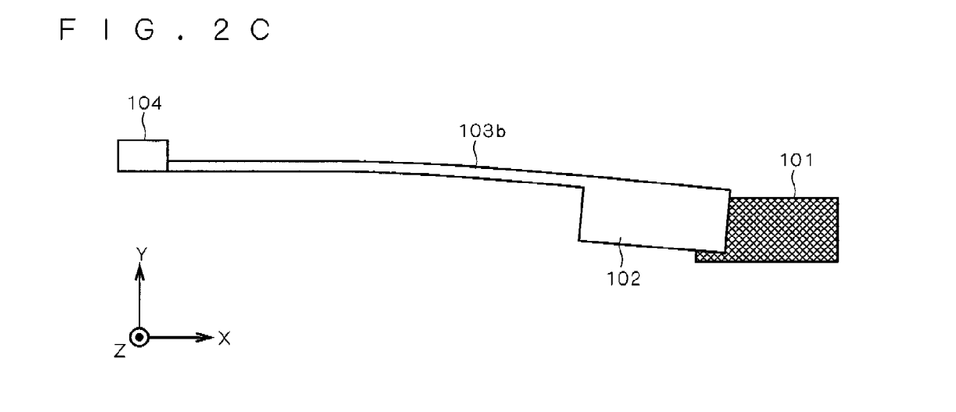

FIGS. 2A to 2C are diagrams showing a second state of the configuration and operation of the electrostatic actuator. FIG. 2A is a top view of the electrostatic actuator, FIG. 2B is a side view of the electrostatic actuator, and FIG. 2C is a side view of the electrostatic actuator when voltage is applied.

In the embodiment, the electrostatic actuator is employed for a driving part of the driving apparatus. As shown in FIG. 1A, the electrostatic actuator is constructed by a first comb electrode 101 and a second comb electrode 102 whose teeth are alternately disposed. The electrostatic actuator uses, as a drive source, an electrostatic force generated by a voltage applied across the two comb electrodes. Such an electrostatic actuator generates forces in different directions according to relative positions of the two comb electrodes. An XYZ rectangular coordinate system is shown in the diagrams. An X-axis direction corresponds to a direction of extension of the teeth of the first comb electrode 101, A Y-axis direction corresponds to a direction along valley spaces between the teeth of the two comb electrodes 101 and 102, and the Z-axis direction corresponds to an alignment direction of the teeth of the first comb electrode 101.

For example, the movement of the second comb electrode 102 in a state where the teeth faces of the fixed first comb electrode (called "stationary comb part" or "stationary part") 101 and the moving second comb electrode (also called "moving comb part") 102 are disposed without any shift in the Y-axis direction as shown in FIG. 1B will be described. In this state, when a switch SW is connected and a voltage is applied across the two comb electrodes, attracting force in the X direction is generated between the stationary comb part 101 and the moving comb part 102. The moving comb part 102 connected to a fixing member 104 via a support member 103a made of an elastic material extendable in the X direction moves in a +X direction by the attracting force. When the switch SW is disconnected, the attracting force generated between the stationary comb part 101 and the moving comb part 102 disappears, and the moving comb part 102 returns to the original position in a -X direction by the elastic force of the support member 103a. In a state where the teeth faces are disposed without any shift in the Y-axis direction, by controlling the voltage applied across the comb electrodes, the moving comb part 102 can be moved in the X directions as shown by an arrow HYa.

Description will be given on the movement of the moving comb part 102 in the state where the teeth faces of the moving comb part 102 are moved in a +Y direction in parallel with the teeth faces of the stationary comb part 101 (also called "a state where the teeth faces are disposed so as to be shifted from each other") as shown in FIG. 2B different from the state where the teeth faces are disposed without any shift in the Y-axis direction as shown in FIG. 1B. A support member 103b in FIGS. 2A to 2C is linear also in top view unlike the support member 103a in FIGS. 1A and 1B. In this state, when the switch SW is connected and a voltage is applied across the two comb electrodes, an attracting force in the X direction and an attracting force in the Y direction are generated between the stationary comb part 101 and the moving comb part 102. The moving comb part 102 connected to the fixing member 104 via the rod-shaped support member 103b receives a force Fx in the +X direction and a force Fy in a -Y direction. The support member 103b is made in a shape and a material having no substantial stretching elasticity while having bending elasticity. Consequently, although the moving comb part 102 does not move in the -X direction, by receiving the force Fy in the -Y direction, the moving comb part 102 moves in the almost -Y direction while making the support member 103b bend (see FIG. 2C). When the switch SW is disconnected, the attracting force generated between the stationary comb part 101 and the moving comb part 102 disappears, and the moving comb part 102 returns to the original position in almost the +Y direction by the bending elastic force of the supporting member 103b. As described above, in the state where the teeth face of the moving comb part 102 moves in the +Y direction in parallel with the teeth face of the stationary comb part 101 from the state where the two comb teeth faces are disposed without any shift in the Y-axis direction, by controlling the voltage applied across the comb electrodes, the moving comb part 102 can be turned (swung) as shown by the arrow HYb.

The force generated across the comb electrodes by the applied voltage increases in proportional to the number of teeth and increases in proportional to the square of the voltage applied. On the other hand, the force generated across the comb electrodes is inverse proportional to the number of teeth and decreases as the distance between the teeth increases. The teeth are disposed in neutral positions so that the distances between the comb electrodes are equal to each other in order to prevent short-circuit caused by contact of the teeth. At the time of designing, it is devised to provide rigidity to each of the teeth.

1-2. Driving Apparatus
1-2-1. Configuration

Figure 3:
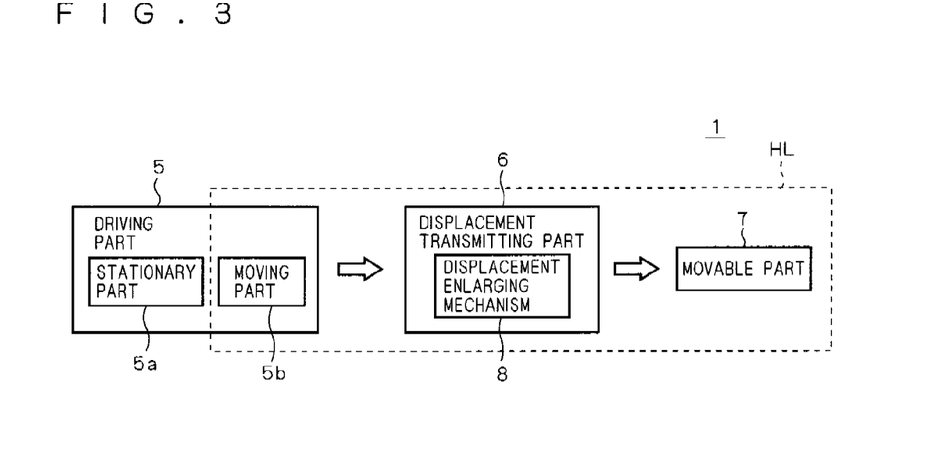
FIG. 3 is a functional block diagram of a driving apparatus in an embodiment.

A driving apparatus 1 of the embodiment will now be described. FIG. 3 is a functional block diagram of the driving apparatus 1 of the embodiment.

As shown in FIG. 3, the driving apparatus 1 has a driving part 5, a displacement transmitting part 6, and a movable part 7.

The driving part 5 has the function of generating a displacement (also called "drive displacement") and giving the drive displacement to the displacement transmitting part 6. In the embodiment, as the driving part 5, the above-described electrostatic actuator having a stationary part 5a and a moving part 5b is employed. By applying a voltage across the comb electrodes, the drive displacement is generated. Specifically, by applying a voltage across the comb electrodes, the moving part 5b is displaced relative to the stationary part 5a. In the electrostatic actuator used as the driving part 5, the teeth faces of the moving comb part and the teeth faces of the stationary comb part are arranged so as to be shifted from each other.

The displacement transmitting part 6 has a displacement enlarging mechanism 8, and has the function of generating an output displacement by increasing (enlarging) the drive displacement supplied from the driving part 5 and transmitting the output displacement to the movable part 7.

The movable part 7 is moved in a predetermined direction in accordance with the output displacement. As the movable part 7, a lens as a driven member (an object) is employed.

In the driving apparatus 1 having such function parts, the moving part 5b, the displacement transmitting part 6, and the movable part (the driven member) 7 existing in the area defined by the broken line HL in FIG. 3 are integrally molded. The details will be described later.

Figure 4:
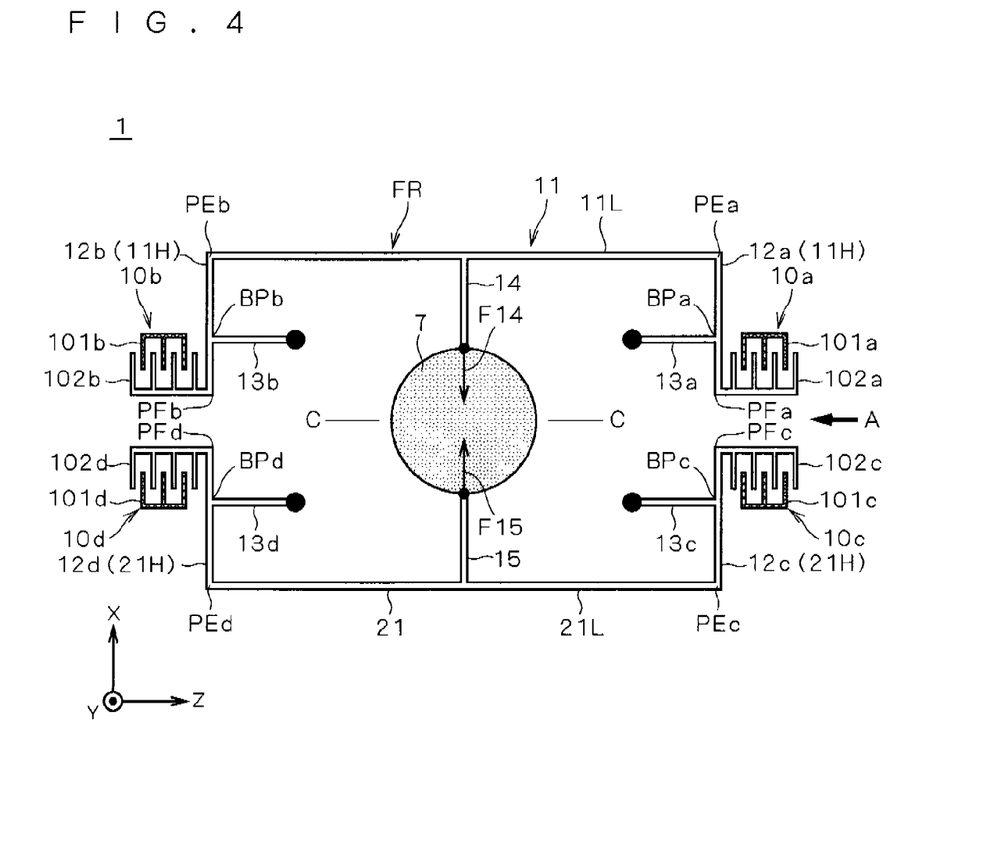
FIG. 4 is a top view of the driving apparatus.
Figure 5:
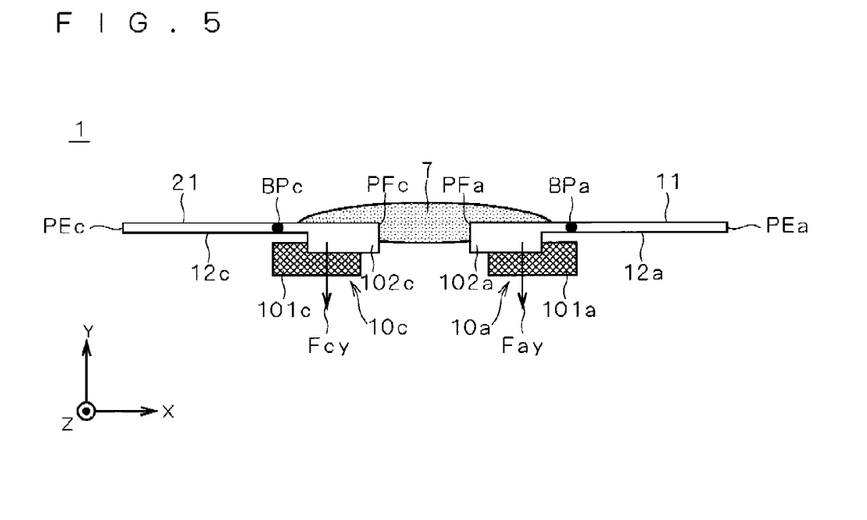
FIG. 5 is a side view of the driving apparatus in an initial state before driving.

A concrete configuration of the driving apparatus 1 having the function parts will now be described. FIG. 4 is a top view of the driving apparatus 1. FIG. 5 is a side view of the driving apparatus 1 in the initial state before driving, viewed from a direction A in FIG. 4.

As shown in FIG. 4, the driving apparatus 1 has an almost-rectangular-shaped frame structure FR disposed apart from the movable part 7 along the outer periphery of the movable part 7. The frame structure FR is divided into halves. A first frame 11 corresponding to one of the divided parts (the upper half in the diagram) and a second frame 21 corresponding to the other part (the lower half in the diagram) are disposed symmetrical with each other with respect to a symmetry line C-C of the movable part 7. The driving apparatus 1 also has four electrostatic actuators 10a, 10b, 10c, and 10d as the driving part 5 for driving the movable part 7 via the frame structure FR. The electrostatic actuators 10a, 10b, 10c, and 10d have stationary comb parts 101a, 101b, 101c, and 101d and moving comb parts 102a, 102b, 102c, and 102d facing the stationary comb parts 101a, 101b, 101c, and 101d, respectively. Each of the electrostatic actuators 10a, 10b, 10c, and 10d generates a drive displacement according to a voltage applied across the comb electrodes.

The frame structure FR is an element of the displacement transmitting part 6 in FIG. 3. In the following, the structure and function of the first frame 11 will be described in detail. The second frame 21 has the structure and function similar to those of the first frame 11.

The first frame 11 is formed by a horizontal side 11L and a pair of vertical sides 11H continued from both ends of the horizontal side 11L. Portions in the first frame 11, nearer to the symmetry line C-C than the middle point of each of the pair of vertical sides 11H are supported by first and second support members 13a and 13b whose one ends are fixed.

The first and second support members 13a and 13b are formed integrally with the first frame 11 and are designed narrower (or thinner) than the first frame 11. With the configuration, the support members 13a and 13b are formed as elastic members which are elastically torsion-deformed more easily than the first frame 11.

The electrostatic actuators 10a and 10b are connected to both ends of the first frame 11, and a drive displacement from each of the electrostatic actuators 10a and 10b is given to the first frame 11. The valley spaces between the teeth of the comb electrodes of the electrostatic actuators 10a and 10b extend in the Y direction of FIG. 4. With the configuration, the electrostatic actuators 10a and 10b can drive the vertical sides 11H in the Y direction by a principle similar to that of FIG. 2A.

In the first frame 11, a first arm member (a first long part) 12a extending via a support point (also called "coupling part") BPa of the first support member 13a using a connection end PFa of the electrostatic actuator 10a as a start point corresponds to one of the vertical sides 11H of the first frame 11, and is an element of a displacement enlarging mechanism 8 (FIG. 3) of the first frame 11. Concretely, as shown in FIG. 5, the first arm member 12a can be tilted in an XY plane using the support point BPa as a fulcrum. The support point BPa is provided between the middle point of the first arm member 10a and the one end PFa of the first arm member 12a. That is, the support point is set between one end PFa of the first arm member 12a and the other end PEa of the first arm member 12a, and near to the one end PFa. Consequently, the first arm member 12a can enlarge the drive displacement given to the connection end PFa by using so-called the principle of leverage and output the enlarged drive displacement at the other end PEa of the first arm member 12a. The details will be described later.

In the first frame 11, a second arm member 12b extending via a support point (coupling part) BPb of the second support member 13b using a connection end PFb of the electrostatic actuator 10b as a start point corresponds to the other vertical side 11H of the first frame 11, and is an element of the displacement enlarging mechanism 8 (FIG. 3) of the first frame 11 like the first arm member 12a.

An almost center portion of the horizontal side 11L of the first frame 11 is coupled to the movable part 7 via a first coupling member 14. The first coupling member 14 is made of a material having bending elasticity and designed narrower (or thinner) than the first frame 11. By such relative size selection, the first coupling member 14 is elastically deformed more easily than the first frame 11. The first frame 11, the first coupling member 14, and the support members 103a and 103b function as the displacement transmitting part 6 for transmitting the drive displacement given from the driving part 5 to the movable part 7.

The second frame 21 has a configuration similar to that of the first frame 11 and is an element of the displacement enlarging mechanism 8. Briefly, the second frame 21 is supported by third and fourth support members 13c and 13d. The electrostatic actuators 10c and 10d are connected to both ends of the second frame 21. The second frame 21 has a third arm member 12c and a fourth arm member 12d using, as fulcrums, support points (coupling parts) BPc and BPd, respectively. The arm members 12c and 12d are elements of the displacement enlarging mechanism 8 which can be tilted in the XY plane.

The second frame 21 is coupled to the movable part 7 via a second coupling member 15. The second coupling member 15 is designed narrower (or thinner) than the second frame 21 and elastically deformed more easily than the second frame 21. The first and second coupling members 14 and 15 are constructed to hold the movable part 7 in positions (symmetrical positions) where they face each other.

As described above, the upper half and lower half using the symmetry line C-C of the movable part 7 as a boundary are symmetrical with each other, and each of them is a unit drive mechanism. In the embodiment, the two unit drive mechanisms are disposed symmetrically with respect to the movable part 7. Each of the unit drive mechanisms has the function itself of moving the movable part 7. In the driving apparatus 1, electrostatic actuators corresponding to each other in the two unit drive mechanisms out of the four electrostatic actuators 10a to 10d are disposed so as to be adjacent to each other (specifically, the electrostatic actuators 10a and 10c, and the electrostatic actuators 10b and 10d in FIG. 4). Therefore, the driving part 5 can be made compact.

The two unit drive mechanisms and the movable part 7 of the driving apparatus 1 are manufactured by the micromachining technique as the semiconductor integrated circuit generating technique. The micromachining technique is a technique capable of precisely processing a fine three-dimensional structure and forming fine parts in an assembled state.

Figure 6A:
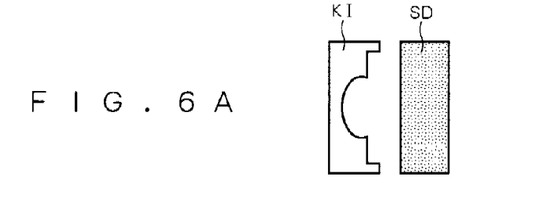
FIGS. 6A, 6B, and 6C are diagrams showing process of manufacturing an operating part and a moving part.
Figure 6B:
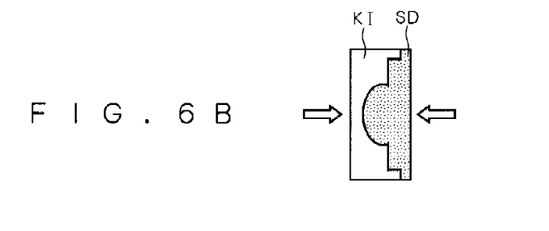
Figure 6C:
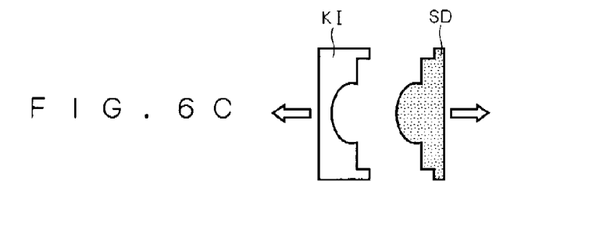
Figure 7:
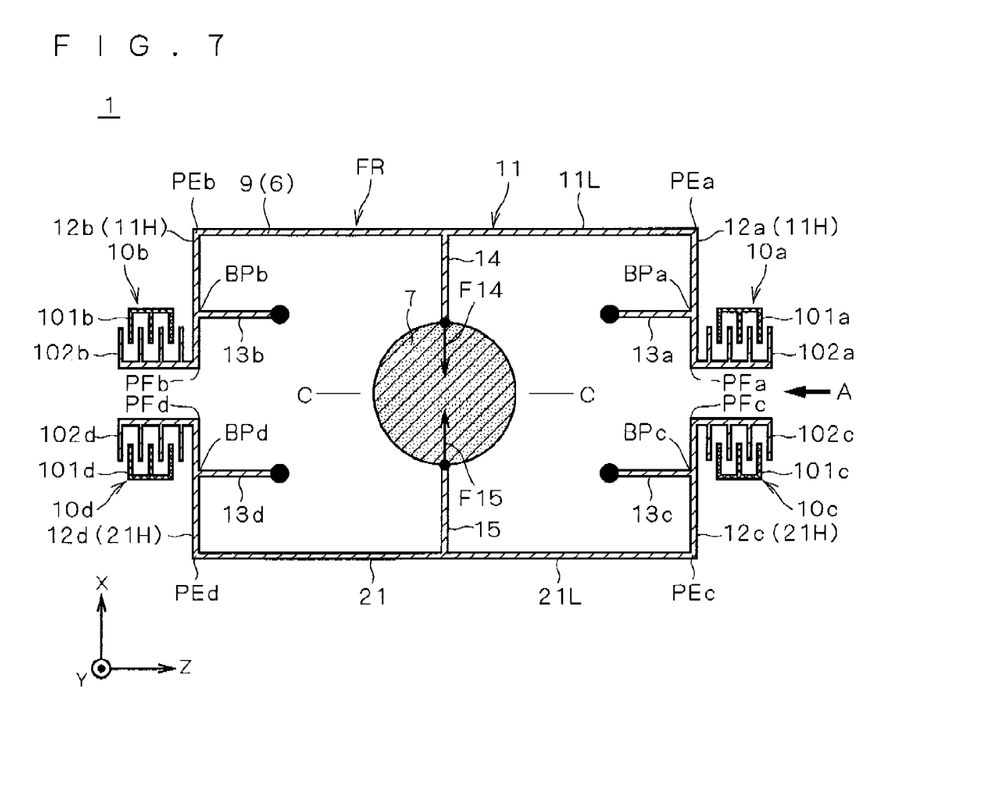
FIG. 7 is a diagram showing an operating part and a movable part which are molded integrally.

In the embodiment, the movable part 7 and a part (also called "operating part") 9 excluding the stationary comb parts 101a to 101d in the two unit drive mechanisms are integrally molded. FIGS. 6A to 6C are diagrams showing process of manufacturing the operating part 9 and the movable part 7. FIG. 7 is a diagram showing the operating part 9 (specifically, the moving comb parts 102a to 102d, the first and second frames 11 and 12, the support members 13a to 13d, and the coupling members 14 and 15) and the movable part 7 which are integrally molded.

As a concrete manufacturing process, first, using the micromachining technique, a material such as silicon (Si), glass carbon, SUS material, or the like is processed to manufacture a mold (also called "imprint mold") KI of the movable part 7 and the operating part 9 (refer to FIG. 6A). Although only the imprint mold KI of the movable part 7 is shown in FIGS. 6A to 6C for simplicity of the drawings, the imprint mold of the operating part 9 is also manufactured integrally with the movable part 7 by the micromachining technique.

Subsequently, by the imprinting method using the imprint mold, the operating part 9 and the movable part 7 are integrally molded. Concretely, as shown in FIG. 6B, by pressing (embossing) a molding material SD to the imprint mold while heating the imprint mold, the operating part 9 and the movable part 7 (in FIG. 6B, the movable part 7) are integrally molded.

The molded operating part 9 and the movable part 7 are cooled down and released from the imprint mold (refer to FIG. 6C).

By such manufacturing process, the operating part 9 and the movable part 7 hatched in FIG. 7 are integrally manufactured (molded). In the embodiment, since the member to be driven is a lens, a material which has translucency and can be provided with the optical function is employed as the molding material SD. More specifically, PDMS, polymethyl methacrylate (PMMA), or the like is employed as the molding material SD.

A thin film made of a conductive metal or the like is formed by sputtering, deposition, or the like on the surface of each of the moving comb parts 102a to 102d in the operating part 9 and the stationary comb parts 101a to 101d of electrostatic actuators manufactured separately by a method similar to the above-described method so that the moving comb parts 102a to 102d and the stationary comb parts 101a to 101d are processed in a state where current can be passed. Either the stationary comb parts 101a to 101d side or the moving comb parts 102a to 102d side is grounded, and voltage is applied to the other side.

As described above, the operating part 9 and the movable part 7 in the driving apparatus 1 are integrally molded, so that an assembly error which occurs in the case of assembling parts to form the operating part 9 and the movable part 7 can be prevented. Since the assembly process of the operating part 9 and the movable part 7 can be omitted, the cost in the manufacturing process can be reduced.

1-2-2. Operation

Figure 8:
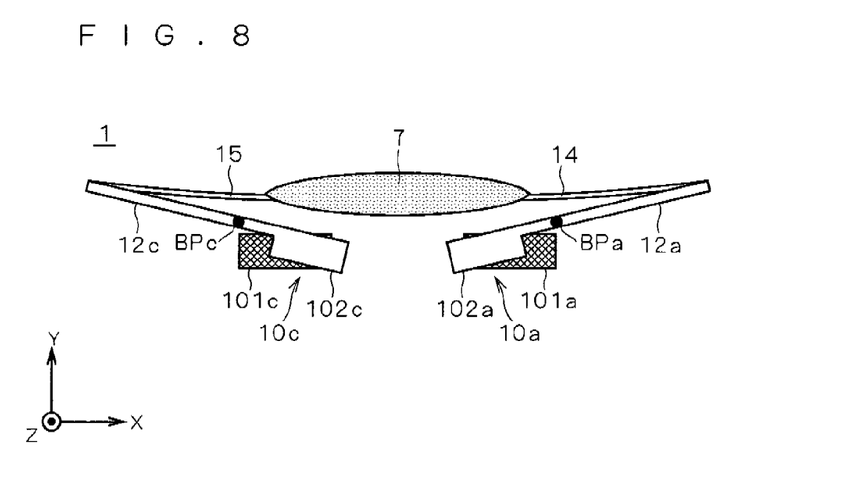
FIG. 8 is a side view of the driving apparatus in a driving state.
Figure 9:
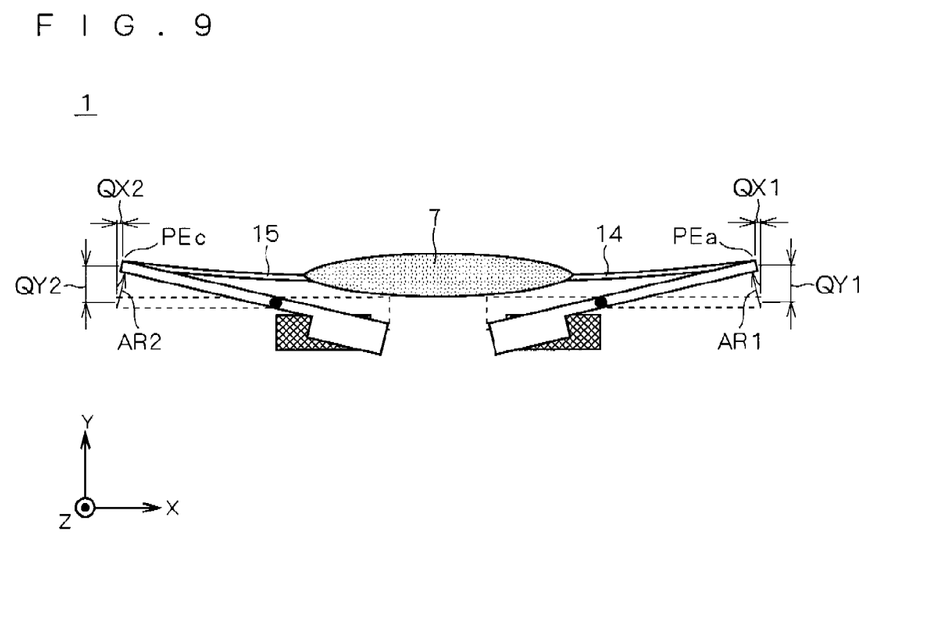
FIG. 9 is a diagram showing an initial state and a drive state of the driving apparatus.

The operation of the driving apparatus 1 having the above-described configuration will now be described. FIG. 8 is a side view of the driving apparatus 1 in a drive state seen from the direction A of FIG. 4. FIG. 9 is a diagram showing an initial state and a drive state of the driving apparatus 1.

In the initial state before driving shown in FIG. 5, when a force Fay in the −Y direction from the electrostatic actuator 10a is applied to the one end PFa side of the first arm member 12a, the first arm member 12a turns (swings) in the XY plane around the support point BPa as a center against the elastic force of the support member 13a while generating twist in the first support member 13a which can be elastically deformed. In brief, the one end PFa of the first arm member 12a displaces in the −Y direction, and the other end PEa of the first arm member 12a displaces in the +Y direction.

The drive displacement given to the one end PFa side of the first arm member 12a by the electrostatic actuator 10a is enlarged (increased) by the displacement enlarging mechanism 8 using the principle of leverage, and the enlarged drive displacement is output to the other end PEa of the first arm member 12a. That is, the displacement (output displacement) output to the other end PEa of the first arm member 12a becomes larger than the drive displacement.

Similarly, when a force Fcy in the −Y direction from the electrostatic actuator 10c is applied to the one end PFc side of the third arm member 12c, the third arm member 12c turns around the support point BPc as a center while generating twist in the elastic-deformable third support member 13c. In brief, the one end PFc of the third arm member 12c displaces in the −Y direction, and the other end PEc of the third arm member 12c displaces in the +Y direction. From the other end PEc side of the third arm member 12c, the displacement enlarged more than the drive displacement given to the one end PFc of the third arm member 12c is output.

The second and third arm members 12b and 12d which are not shown in FIG. 5 are tilted on receipt of the forces from the electrostatic actuators 10b and 10d. From the other ends PEb and PEd of the arm members 12b and 12d, the displacement enlarged more than the drive displacement given to the one ends PEb and PEd of the arm members 12b and 12d is output.

The output displacement generated at each of the other ends PEa and PEb of the two arm members 12a and 12b in the first frame 11 is transmitted to the movable part 7 via the first coupling member 14. The output displacement generated at each of the other ends PEc and PEd of the two arm members 12c and 12d in the second frame 21 is transmitted to the movable part 7 via the second coupling member 15. As the output displacement increases, the movable part 7 moves in the +Y direction as shown in FIG. 8.

At this time, with movement in the +Y direction of the movable part 7, the first and second coupling members 14 and 15 hold the movable part 7 while being elastically deformed. This configuration enables the driving apparatus 1 to move smoothly.

Concretely, when driven, the arm members 12a to 12d turn around the support points BPa to BPd as a center. Therefore, each of output displacements generated at the other ends PEa to PEd of the arm members 12a to 12d includes a displacement QX in the X direction and a displacement QY in the Y direction.

For example, the output displacement (first output displacement) generated by the first and second arm members 12a and 12b in the drive state shown in FIG. 9 is expressed as an arrow AR1. The first output displacement can be expressed by a displacement QX1 in the −X direction and a displacement QY1 in the +Y direction. The output displacement (second output displacement) generated by the third and fourth arm members 12c and 12d in the drive state shown in FIG. 9 is expressed as an arrow AR2. The second output displacement can be expressed by a displacement QX2 in the +X direction and a displacement QY2 in the −Y direction.

As described above, the first output displacement in the first frame 11 and the second output displacement in the second frame 21 have the displacement QX1 in the −X direction and the displacement QX2 in the +X direction, respectively. Consequently, in the drive state of FIG. 9, the distance between the other end PEa of the first arm member 12a and the other end PEc of the third arm member 12c is shorter than the distance in the initial state of FIG. 5. Therefore, in the drive apparatus 1 using the displacement enlarging mechanism 8, by designing that the first and second coupling members 14 and 15 to be elastically deformed more easily as compared with the frame and, at the time of operation, making the two coupling members elastically deformed (causing bending deformation), the displacement in the X direction generated by the driving is absorbed, and operation by parallel cooperation of the two unit driving mechanisms in the driving apparatus 1 is made smooth.

As described above, in the driving apparatus 1, the first and second coupling members 14 and 15 sandwich the movable part 7 in positions where they face each other. With the configuration, a force F14 in the −X direction applied from the first coupling member 14 to the movable part 7 and a force F15 in the +X direction applied from the second coupling member 15 to the movable part 7 can be applied to the movable part 7 from facing directions in the same straight line (refer to FIG. 4). Therefore, without disturbing the balance of the movable part 7 by the force F14 from the first coupling member 14 and the force F15 from the second coupling member 15 in operation, the movable part 7 can be moved in the Y direction in parallel with the X axis while holding (maintaining) the posture of the movable part 7.

The movable part 7 that moves in the +Y direction with increase in the output displacement stops in a position where the forces from the electrostatic actuators 10a, 10b, 10c, and 10d and the restoring forces of the torsion of the support members 13a, 13b, 13c, and 13d caused by the tilt of the arm members 12a, 12b, 12c, and 12d are balanced. For example, when application of the voltage across the comb electrodes is stopped, the movable part 7 returns to the original position by the restoring forces of the support members 13a to 13d in which the torsion occurs. Therefore, in the embodiment, since the forces generated in the electrostatic actuators 10a to 10d increase in proportion to the square of the voltage applied across the comb electrodes, in the driving apparatus 1, by controlling the application voltage, the displacement (movement amount) of the movable part 7 can be adjusted.

As described above, the driving apparatus 1 can enlarge the drive displacement from the electrostatic actuators 10a to 10d and move the movable part 7 in the Y direction in parallel with the X axis. With the configuration, even in the case where the drive displacement of the driving part 5 is small, the sufficient movement amount can be assured in the movable part 7. By using the electrostatic actuators 10a to 10d as the driving part 5, as compared with the case of using a stepping motor or the like as the driving part 5, the driving apparatus 1 can be made smaller for the reason that it is unnecessary to assure the proper space for the driving part 5.

In the embodiment, when a direction connecting the coupling members 14 and 15 is set as a vertical direction, a plurality of unit drive mechanisms are disposed vertically symmetrical and are laterally symmetrical with respect to the connection points of the coupling members 14 and 15 and the frames 11 and 12. With the structure, by applying the same voltage to the electrostatic actuators 10a to 10d, the movable part 7 can be moved without changing the posture of the movable part 7.

2. Application Example

An application example of the driving apparatus 1 of the embodiment will now be described.

Figure 10:
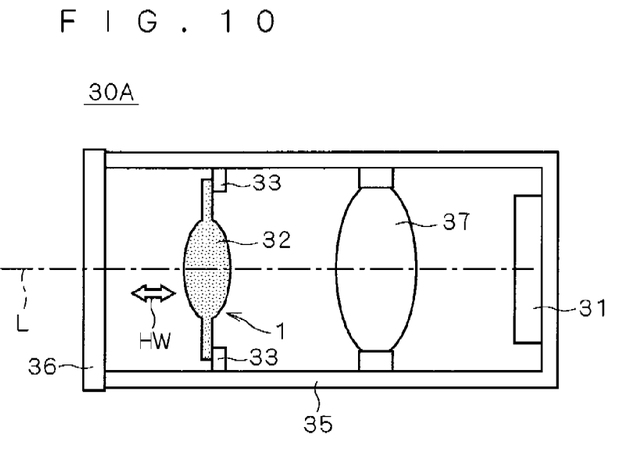
FIG. 10 is a diagram showing an image capturing unit.
Figure 11:
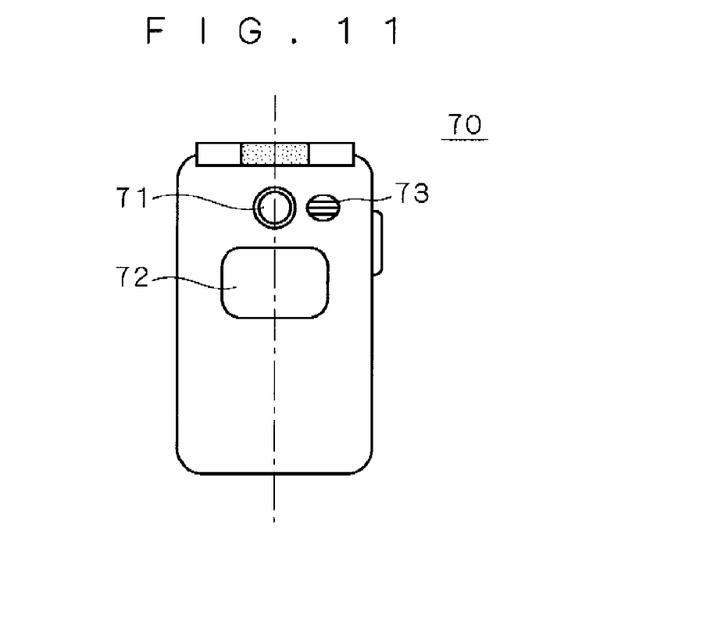
FIG. 11 is a diagram showing a foldable cellular phone having the image capturing unit.

As an application example of the driving apparatus 1, there is an image capturing unit employing the driving apparatus 1 as an AF mechanism. As a kind of the image capturing apparatus having the image capturing unit, there is a foldable cellular phone. FIG. 10 is a diagram showing an image capturing unit 30A. FIG. 11 is a diagram showing the foldable cellular phone having the image capturing unit 30A.

As shown in FIG. 10, the image capturing unit 30A has a package (box member or housing) 35 and a guard glass 36. The package 35 and the guard glass 36 form an enclosed space (internal space), and the image capturing unit 30A has, in the enclosed space, an image pickup device 31, the driving apparatus 1 for driving a zoom lens 32 as an imaging optical system, and a fixed lens 37.

The image pickup device (for example, CCD) 31 is constructed as an area sensor in which filters of transmitting primary colors of R (red), G (green), and B (blue) are arranged in checkers on the pixel unit basis (Bayer arrangement). The image pickup device 31 functions as image pickup means for obtaining an image signal of an image of a subject. The image pickup device 31 is disposed in a position where an image of the subject entering through the guard glass 36 is formed in the package 35. In the embodiment, as shown in FIG. 10, the image pickup device 31 is disposed on the surface facing the guard glass 36 out of the surfaces constructing the package 35.

The driving apparatus 1 for driving the zoom lens 32 as a member-to-be driven is fixed on a fixing part 33 existing between the guard glass 36 and the fixed lens 37 in the enclosed space. The zoom lens 32 is moved in an optical axis L direction as shown by a two-headed arrow HW by the operation of the driving apparatus 1.

In the image capturing unit 30A having such a configuration, by controlling the voltage applied across the comb electrodes, the zoom lens 32 is moved in the optical axis L direction, thereby adjusting the focal point.

To prevent invasion of dusts into the space formed by the package 35 and the guard glass 36, the image capturing unit 30A is assembled in, for example, a clean room (or a clean bench). Further, by forming the enclosed space in the image capturing unit 30A, invasion of dusts into the electrostatic actuator used for the driving part 5 of the driving apparatus 1 is prevented and the electrostatic actuator is protected. Since there is no convection of air by the formation of the enclosed space in the image capturing unit 30A, variations in the load on the driving apparatus 1 can be reduced.

As described above, in the image capturing unit 30A, the driving part 5 in the driving apparatus 1 is disposed together with the imaging optical system in the internal space formed by the package 35 and the guard glass 36. Consequently, it is unnecessary to assure the proper space for the driving part 5, so that the image capturing unit 30A can be miniaturized.

The image capturing unit 30A is mounted as a micro camera unit (MCU) on a small electronic device (image capturing apparatus) such as a cellular phone 70 shown in FIG. 11 or the like. The cellular phone 70 has a camera lens part 71, an external display 72, and a light 73 for photographing. The image capturing unit 30A is built in the cellular phone 70 so as to be able to capture an image of a subject guided from the camera lens part 71.

As described above, the driving apparatus 1 which can be miniaturized is employed as, for example, a driving apparatus for driving a part in the MCU (in this case, the lens in the imaging optical system), so that the MCU can be further miniaturized.

3. Modification

The embodiment of the present invention has been described above. However, the invention is not limited to the above description.

Figure 12:
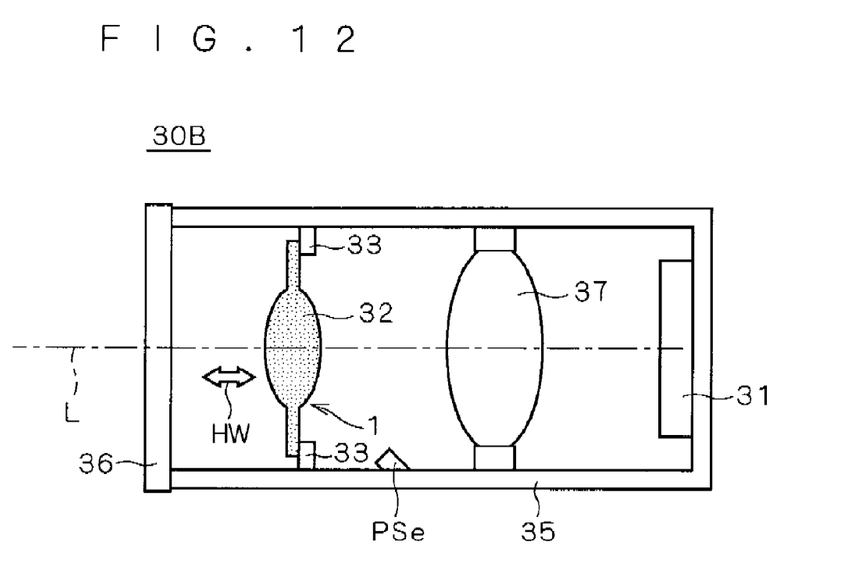
FIG. 12 is a diagram showing the image capturing unit having a position sensor.

For example, the image capturing unit 30A in the application example may further comprise a position sensor for measuring the position of the image pickup device 31. FIG. 12 is a diagram showing an image capturing unit 30B having a position sensor PSe.

Concretely, as shown in FIG. 12, the position sensor PSe for measuring the position of the movable part 7 is disposed in the enclosed space of the image capturing unit 30B, and the position (measured position) of the movable part 7 is obtained from the position sensor PSe. The position information is compared with the position (conversion position) of the movable part 7 obtained by converting the application voltage, and the present position of the movable part 7 is corrected. Specifically, in the case where the measurement position and the conversion position are different from each other, the application voltage is corrected so that the measurement position coincides with the conversion position, and a feedback control to correct the present position of the movable part 7 is performed.

With the configuration, also in the situation where the operation precision of the driving apparatus 1 deteriorates, proper focus adjustment can be performed. As the position sensor PSe, for example, a sensor for measuring the distance to an object by using reflection light of a laser emitted to the object can be employed.

In the foregoing embodiment, as the molding material SD of the operating part 9 and the movable part 7, the material having translucency is used unconditionally. However, the invention is not limited to the material. Concretely, by using the material having translucency as the material of the movable part 7 and using the material having no translucency as the material of the operating part 9, the operating part 9 and the movable part 7 may be integrally molded.

While the invention has been shown and described in detail, the foregoing description is in all aspects illustrative and not restrictive. It is therefore understood that numerous modifications and variations can be devised without departing from the scope of the invention.

What is claimed is:

1. A driving apparatus for driving an object, comprising:
   a driving part having a stationary part and a moving part configured so as to be moveable relative to the stationary part;
   a displacement transmitting part for transmitting a displacement to said object connected with a connection part in accordance with a drive displacement of said moving part, and
   a supporting part formed as an elastic member coupled to said displacement transmitting part and elastically supporting said displacement transmitting part, between the connection part and said moving part, and closer to said moving part,
   wherein said displacement transmitting part has an arm member which is configured to tilt against elastic force of said supporting part while using a coupling part coupled to said supporting part as a fulcrum, said arm member being connected with said moving part at one side and said connection part at the other side, said moving part and said displacement transmitting part being integrally molded,
   said drive displacement is enlarged by leverage created by a tilt of said arm member, resulting in amplified movement of said object relative to the movement of said moving part,
   wherein a portion of the stationary part and a portion of the moving part are each coated with a conductive material;
   wherein said stationary part and said moving part are configured to move with respect to each other under an electrostatic force generated between said coated portion of the stationary part and said coated portion of the moving part.

2. The driving apparatus according to claim 1, wherein said object, said displacement transmitting part, and said moving part are integrally molded.

3. The driving apparatus according to claim 1, wherein said moving part and said object are coupled to a first part on one end side of said arm member and a second part on the other end side, respectively, and
   said coupling part is set between said first part and said second part of said arm member, and near to said first part.

4. The driving apparatus according to claim 1, further comprising a plurality of unit driving mechanisms each having said driving part and said displacement transmitting part,
   wherein arm members of said plurality of unit driving mechanisms are coupled to a plurality of places on said object, so that said object can be moved by parallel cooperation of said plurality of unit driving mechanisms.

5. The driving apparatus according to claim 1, wherein said driving part is an electrostatic actuator.

6. The driving apparatus according to claim 1, wherein said object is a member having translucency.

7. The driving apparatus according to claim 1, wherein said object is an optical lens.

8. A drive apparatus comprising:
   one or more stationary comb electrodes;
   an optical element;
   one or more integrally molded frame members, each of said frame members having one or more movable comb electrodes, each of said movable comb electrodes having a one-to-one correspondence with said stationary comb electrodes, each of said movable comb electrodes disposed opposite and displaced from its corresponding stationary comb electrode, each of said frame members having a coupler extending therefrom, each of said couplers coupled to said optical element; and
   one or more support members, each of said support members having a one-to-one correspondence with a movable comb electrode, each of said support members located between the corresponding movable comb electrode and a coupler and closer to the movable comb electrode, each support member extending from a frame member as a fulcrum about which the frame member is capable of rotating in response to a drive displacement of the corresponding movable comb electrode, wherein an application of electrostatic force to a movable comb electrode results in a drive displacement of the movable comb electrode, said drive displacement is enlarged by leverage created by a tilt of said frame member, resulting in amplified movement of said optical element relative to the movement of said movable comb electrode.

9. The drive apparatus according to claim 8, wherein said optical element and said one or more frame members are integrally molded.

10. The driving apparatus according to claim 8, wherein said optical element is a lens.

11. A driving apparatus for driving an object, comprising:

a driving part having a stationary part and a moving part displaced relative to the stationary part, a displacement transmitting part for transmitting a displacement to said object connected with a connection part in accordance with a drive displacement of said moving part, and a supporting part formed as an elastic member coupled to said displacement transmitting part and elastically supporting said displacement transmitting part, between the connection part and said moving part, and closer to said moving part, wherein said displacement transmitting part has an arm member which is capable of tilting against elastic force of said supporting part while using a coupling part coupled to said supporting part as a fulcrum, and said moving part connected with said arm member at one side and said connection part at the other side, said moving part and said displacement transmitting part are integrally molded, said drive displacement is enlarged by leverage created by a tilt of said arm member, resulting in amplified movement of said object relative to the movement of said moving part.

* * * * *